United States Patent [19]
Piskorz et al.

[11] Patent Number: 5,853,548
[45] Date of Patent: Dec. 29, 1998

[54] ENERGY EFFICIENT LIQUEFACTION OF BIOMATERIALS BY THERMOLYSIS

[75] Inventors: Jan Piskorz; Piotr Majerski; Desmond Radlein, all of Waterloo, Canada

[73] Assignee: RTI Resource Transforms International Ltd., Canada

[21] Appl. No.: 712,191

[22] Filed: Sep. 11, 1996

Related U.S. Application Data

[63] Continuation-in-part of Ser. No. 650,947, May 20, 1996.

[51] Int. Cl.$^6$ .................................................. C10B 49/10
[52] U.S. Cl. .................................... 201/7; 201/8; 201/25; 201/31; 201/36
[58] Field of Search .............................. 201/7, 8, 25, 31, 201/36, 39

[56] References Cited

U.S. PATENT DOCUMENTS

| | | | |
|---|---|---|---|
| 3,853,498 | 12/1974 | Baille | 48/209 |
| 4,150,021 | 4/1979 | Sowards | 201/4 |
| 4,153,514 | 5/1979 | Garrett Mallan | 201/2.5 |
| 5,413,227 | 5/1995 | Diebold | 209/722 |

FOREIGN PATENT DOCUMENTS

| | | |
|---|---|---|
| 1163595 | 3/1984 | Canada . |
| 1241541 | 9/1988 | Canada . |

*Primary Examiner*—Edward J. Cain
*Attorney, Agent, or Firm*—Hall, Priddy & Myers

[57] ABSTRACT

A thermolysis process for the production of volatiles for an external combustor or liquefaction of biomass solids in which specific and previously unrecognized conditions are employed. The thermolysis is carried out in a single fluidized bed of inert material operating at near atmospheric pressure, relatively low temperature, long solids and gas residence times and moderate heating rates. The distribution of the thermolysis products among, solid (char) and gases under these conditions is unique. The product effluent can be either quenched to produce a high liquid yield in addition to a low char yield or the volatile effluent can be used in either the same combustor or a second combustor to produce heat energy a particularly high efficiency system. In using a quencher, the quenched liquid is of similar composition to those obtained by so called fast pyrolysis processes of the prior art. The specified conditions are such as to allow production of liquids in high yields in an energy efficient manner. The low severity of the conditions in comparison with previous approaches allows simplified process design and scale-up leading to lower capital and operating costs as well as easier control.

20 Claims, 2 Drawing Sheets

ENERGY EFFICIENT LIQUEFACTION OF BIOMATERIALS BY THERMOLYSIS

RELATED APPLICATIONS

The present application is a continuation-in-part of application Ser. No. 08/650,947 filed on the 20th day of May, 1996.

FIELD

This invention relates generally to the conversion of biomass to liquid, solid (char), and gaseous products by heating in a substantially non-oxidizing atmosphere in a single fluid bed of inert solids, and specifically to those processes where the intention is to produce principally a product, either gaseous or liquid ("bio-oil"), for use as a fuel or as a source of chemicals. Processes of this kind are accurately described as thermolysis although they are usually referred to as pyrolysis.

BACKGROUND

U.S. Pat. No. 3,853,498, (Bailie, December 1974) discloses a process for gasification of municipal waste by pyrolysis in a twin fluid bed reactor in which inert solids are circulated between the beds. Pyrolysis processes which circulate sand from one reactor to another can be expensive, difficult to operate continuously or inefficient.

U.S. Pat. No. 4,153,514, (Garrett and Mallan, May 1979) discloses a pyrolysis process for recovery of chemical values from waste solids using a so called "entrained flow pyrolyzer". It is basically a circulated bed transport reactor where the solid heat carrier is the char by-product of pyrolysis. The char is partially burnt to raise its temperature to 870 C. This hot char is injected into the pyrolyzer where it is mixed turbulently with the feed. In this process the char and liquid yields were 19.8 wt % and less than 40% respectively at 430° C. The liquid yield is extremely low. This might be attributed to the fact that catalytic cracking action of hot pyrolysis char on biomass liquids was not recognized by the inventors, (M. L. Boroson et al, "Heterogeneous Cracking of Wood Pyrolysis Chars over Fresh Wood Char Surfaces", Energy and Fuels, Vol. 3, p. 735, 1989).

U.S. Pat. No. 4,510,021 (Sowards, April 1985) discloses a process for conversion of combustible wastes like wood or sawdust to charcoal by pyrolysis in a fluidized bed. This is a partial oxidation process with no bio-oil production whatsoever. The removal of the char product is accomplished by self-regulated, automatic elutriation when the density of the charcoal particles falls to a sufficiently low value—the so called "blow through mode".

Canadian Patent No. 1,163,595, (Chornet and Roy, March 1984), discloses the production of organic products and liquid fuels from lignocellulosic materials by vacuum pyrolysis. This process will be referred to as Sherbrooke Vacuum Pyrolysis. Importantly, it was pointed out that most of the condensable organics are released before 530° C. and that reaction beyond 530° C. produces mainly additional gas from the residual char. Furthermore, it was claimed that high liquid yields could be obtained even at heating rates as low as 1° C. per minute with residence times of approximately 1 second for volatile products. This patent also discloses that in the vacuum pyrolysis of biomass, liquid yields decreased with increasing pressure and that the pressure in the reaction zone should be maintained at no more than 100 mm/Hg (absolute pressure). There is a clear penalty in capital and operating costs for maintaining this degree of vacuum. Moreover, vacuum processes in general suffer from poor heat and mass transfer.

Canadian Patent No. 1,241,541, (D. S. Scott, 1988) describes a single shallow fluidized bed apparatus for pyrolysis of biomass. It was claimed that with this apparatus it would be possible to obtain liquid yields in excess of 45 weight % at gas residence times of 0.1 to 10 seconds. In the only example presented the pyrolysis temperature was 500° C. In a subsequent patent, (Canadian Patent No. 1,332,580, October 1994), Scott describes conditions for maximizing liquids in fast pyrolysis processes. This fluidized bed process has come to be known as the Waterloo Flash Pyrolysis Process. Among the results presented it was disclosed that the char yield at 430° C. and the preferred residence times of 0.6 seconds was 30.5 wt %. The short residence times stipulated in these patents are such that pyrolysis would be likely to be incomplete at temperatures below 500° C. This conclusion appears to be substantiated by the high "char" yield, and its surprisingly high oxygen content (greater than 30%) reported for 425° C., (D. S. Scott, ENFOR Project C-223, Final Report, 1984).

Canadian Patent, (Berg, 1991) discloses a non-fluidized bed apparatus for so called "Rapid Thermal Processing" in which provision is made for rapid mixing of two different solids. No pyrolysis results were given however. The patent only describes an apparatus for mixing impinging jets of solids which can potentially be applied to biomass thermal processing.

U.S. Pat. No. 5,413,227, (Diebold, May 1995) discloses an apparatus for ablative pyrolysis of biomass in a vortex type reactor in which the required pressure for ablation is generated by centrifugal forces. This is an innovative approach to pyrolysis as no heat carrier solids are required. The main criticism is that the centrifugal forces required for good heat transfer diminish rapidly with decreasing particle size. Furthermore the best reported yields of bio-oil were obtained at close to 600° C.

There has been extensive research, on both the laboratory and pilot plant scale, into the production of bio-oil by pyrolysis. The general conclusion is that among non-vacuum processes, high yields of bio-oil can only be obtained by so called Fast Pyrolysis processes. The latter have the following common features: high rate of heat transfer, moderate temperatures (500°–650° C.) and a short (of the order of 1 second) residence time of product vapor in the reactor. They result in a high yield (up to 65–80%) conversion of biomass into liquid product.

The general philosophy of this approach has been clearly summarized as follows by Graham (R. G. Graham, B. A. Freel, D. R. Huffman, "Developments in Rapid Thermal Processing: Biomass Fast Pyrolysis", presented at the 6th European Conference on Biomass for Energy, Industry and Environment, Athens Greece, April, 1991):

"Fundamental research in the 1970's clearly demonstrated that high yields of non-viscous liquid products could be obtained from biomass at the expense of char production under conditions of fast pyrolysis. These conditions include:

Fast Heating of the Feedstock (rapid heat transfer)
Short Contact Times
Rapid Product Quench.

. . . Fast pyrolysis techniques must be clearly distinguished from conventional "slow" pyrolysis which typically produces low-value, secondary chemicals and a 20–30% yield of heavy (viscous ) "tar". Fast pyrolysis of wood or other biomass provides a high yield (70–90%) of a primary liquid product.

. . . Fast pyrolysis processes are, therefore, fundamentally different from slow pyrolysis in terms of chemistry, overall yields and quality of products."

Fast pyrolysis systems described in the technical literature include the following: (1) ablative pyrolysis (Diebold, J. P., Scahill, J., in "Pyrolysis Oils from Biomass: Producing, Analyzing, and Upgrading," Soltes, E. J., Milne, T. A., Eds., ACS Symposium Series No. 376, American Chemical Society, Washington, D.C., 1988, pp 31–40), (2) circulating fluid bed pyrolysis, (Ensyn Rapid Thermal Pyrolysis, Graham, R. G., Freel, B. A., Bergougnou, M. A. in Research in Thermochemical Biomass Conversion, Bridgewater, A. V., Kuester, J. L. Eds., Elsevier Applied Science, New York, 1988, pp 629–641), (3) shallow fluid bed pyrolysis (Waterloo Fast Pyrolysis Process, Scott, D. S., Piskorz J., Radlein D. Ind. Eng. Chem., Process Des. Dev. 1985, 24, p 581) and (4) entrained flow pyrolysis (Kovac, R. J., Gorton, C. W., O'Neil, D. J., Thermochemical Conversion Program Annual Meeting, Solar Energy Research Institute, Golden, Colo., 1988, SERI/CP-231-3355, pp 5–20.)

It is also useful to compare the results of Vacuum Pyrolysis with those of Fast Pyrolysis. In a recent publication Pakdel and Roy (H. Pakdel and C. Roy, in Biomass Thermal Processing, Proceedings of the First Canada/European Community R&D Contractors Meeting, October 1990, E. Hogan, J. Robert, G. Grassi and A. V. Bridgewater (eds.), CPL Press, p.144), show that maximum yields of liquids in excess of 60 weight % can be obtained by vacuum pyrolysis of wood at temperatures in the range 380°–550° C. On the other hand, in atmospheric pressure fast pyrolysis maximum liquid yields are obtained at temperatures in the range 480°–550° C. and short vapour residence times.

Furthermore the liquids obtained by fast pyrolysis are known to be of somewhat different chemical character from those obtained by vacuum pyrolysis. For example, the total liquid yield from vacuum pyrolysis of hardwoods is around 60 weight % and the water yield around 20 weight %, both on a moisture free feed basis. By comparison, fast pyrolysis of the same feedstocks typically give total liquid and water yields of 65–80 weight % and 15 weight %, respectively, on a moisture free feed basis. Approximately as a further example, two key products which distinguish fast pyrolysis liquids from vacuum pyrolysis liquids are hydroxyacetaldehyde and acetic acid. It was reported by Elliott (D. C. Elliott, IEA Co-operative Test Facility Project D1, Final Report, December 1983) that the respective concentrations of these chemicals in the water free organic liquids obtained by pyrolysis of poplar were 11.4 and 5.7 weight % by Waterloo Flash Pyrolysis and 7.0 and 12.0 weight % by Sherbrooke Vacuum Pyrolysis.

In summary, the current state of the art of pyrolysis may be characterized briefly by the reactor temperatures and contact times as follows:

| Reactor Type | Temperature, °C. | Reaction Time |
| --- | --- | --- |
| Ultra Fast Reactors | 800 | 100 milliseconds or less |
| Fast Pyrolysis Reactors | 475–650 | Up to a few seconds |
| Thermolysis Process of this invention | 375–450 | 1 to 60 seconds |
| Vacuum Pyrolysis | Less than 400 | Several minutes |
| Destructive Distillation of Wood | Less than 400 | Hours |

SUMMARY OF THE INVENTION

According to the invention there is provided a process for the thermolysis of shredded biomass to produce liquid which is similar in composition to the liquid produced from fast pyrolysis. The process comprises introducing the biomass, shredded to a sufficiently small size so that its size does not limit significantly the production of liquid, into a thermolysis reactor having a bed of inert material with a height to width ratio greater than one, introducing substantially non-oxidizing gas is also introduced so that it flows upwardly through the bed at a linear velocity so as to cause automatic elutriation of product char and fluidizing of the bed of inert material to form a fluidized bed and heating indirectly the fluidized bed so that the substantially non-oxidizing gas and fluidized bed have a temperature in the range of 360° to 490° C. The substantially non-oxidizing gas and fluidized bed cause the thermolysis of the biomass producing an effluent reactor stream comprising hot char particles and volatiles, namely, gas, aerosols, and vapours. The process includes removing the elutriated char particles from the effluent reactor stream, and quenching the gas, aerosols and vapours to partly liquify the vapours and aerosols so that the vapours and aerosols do not contact dry surfaces of the quencher whose temperatures are in the range of 100° C. to 360° C. The fluidized bed is sufficiently deep so that the residence time of the substantially non-oxidizing gas in the reactor is greater than 2 seconds.

Preferably, the mass of non-oxidizing gas to biomass is less than 2 to 1.

It has become clear that economic production of liquid fuels from biomass by pyrolysis requires technologies featuring simplicity of design, scaling up, operation and control as well as flexibility of operation. For example, the use of wastes and other contaminated feeds implies decoupling of char collection from heat generation. This diminishes the attraction of a circulating fluid bed approach where a solid heat carrier is contacted with char particulates in a combustion/heat generation step. Independent heat supply and eventual char disposal would therefore provide greater flexibility of operation.

We have found that the nature of bio-oil vapours and aerosols is such that useful high-temperature heat cannot be recovered from the reactor effluent by simple heat exchange; instead the product must be rapidly quenched. Consequently thermal efficiency requirements dictate that these quenching requirements be minimized. This implies that the system should use as small a gas recycle ratio as possible and that the reactor effluent be at as low a temperature as is feasible. The lowest such temperature which prevents fouling of surfaces is in the range 380°–420° C. These requirements are difficult to obtain in reactors where hot inert solids are in circulation and in thermal vortex type ablative pyrolyzers. On the contrary, so called "adiabatic quenching" is very beneficial and attainable in standard fluid bed systems including deep, shallow, bubbly, turbulent, etc. beds. The endothermic nature of bio-oil cracking should be utilized to maximize liquid yields by "freezing" secondary thermal decomposition.

A disadvantage of many rapid pyrolysis systems like shallow fluid beds, circulating fluid beds, entrained flow reactors, etc. is the large mount of carrier gas required to maintain short contact times. This gas represents increased capital and operating costs and incurs a penalty of loss of thermal efficiency for the reasons explained above.

Recycle gas containing carbon monoxide, carbon dioxide methane and organic vapours can be a source of small quantities of micro carbon-like particulates in high temperatures regimes. This soot like material is usually collected with the bio-oil and for some applications, for example as fuel for internal combustion engines, can render the oil unsuitable. Thus preheating of the recycle gas stream above 600° C. should be avoided.

The requirement of low solids content of the bio-oil also favours the use of pyrolysis systems in which attrition/abrasion of solids is minimized. This, therefore, is a general problem for all fluidized bed processes. It is well established in the scientific literature (M. L. Boroson, J. B. Howard, J. P. Longwell, and W. A. Peters, A.I.Ch.E.J., Vol. 35, p.120–128, 1989), that the cracking kinetics of the primary volatile products of pyrolysis are favourable (i.e. slow) in a homogenous environment below 500° C. Thus, introduction of foreign solids into the reactor free space changes the conditions to heterogeneous and this augments cracking of primary products to yield more gases and pyrolytic water.

Some systems (circulating beds) suffer from dynamic constraints like choking, back mixing of product vapours, bed expansion above that which is optimal for heat transfer considerations. Other systems are not widely used or researched and are yet to be proven and independently verified.

The disadvantages of the use of shallow fluidized beds for production of high liquid yields from biomass has been stressed in the recent technical literature. A principal criticism has been that the scale-up of such equipment is difficult and expensive because of the severe requirement of short residence times characteristic of Fast Pyrolysis. For example Berruti et al. ("Study of the performance of a large fluidized bed with multiple feed points for flash biomass pyrolysis", presented at the International Conference on Fluidization Engineering Foundation, Banff, Alberta, May, 1989.) point out that: "The scale-up of a sand fluidized bed for flash biomass pyrolysis is not an easy task. Mixing and dispersion of the solid reactant, gas residence time, entrainment of solids products and temperature distribution are extremely important parameters. The same concepts and considerations apply to any situation where the gas-solid reaction studied is fast (combustion, ultrapyrolysis, gasification). One of the limitations in designing a large scale fluid bed for biomass pyrolysis is the depth of the reactor, dictated by the narrow range of gas residence times allowable for an optimal organic liquid production. As a results, the reactor has to be large and shallow. In a large and shallow fluidized bed it becomes necessary to introduce the solids biomass feed to the bed through multiple feed points to achieve a relatively even distribution through the reactor . . . "

More recently Freel and Graham, ("Method and Apparatus for a Circulating Bed Transport Reactor System", PCT/CA91/00022) point out that: "This reactor system fulfills the requirement of rapid heating rate, controlled elevated temperature, and relatively short average residence time; however, a major limitation of the shallow bubbling fluidized-bed reactor, centers on the inability to effectively achieve economical scale-up to industrial applications. While a fluidized-bed can be scaled up, the requirement for acceptable fluidization properties requires a corresponding scale-up of the bed depth which does not allow the specific short average residence time to be maintained. . ."

The requirement of short residence times for bio-oil production as stipulated by the prior art can in fact be traced to the belief that very high heating rates are required to obtain high liquid yields with optimal reaction temperature being about 500° C. However it has been established (M. L. Boroson, J. B. Howard, J. P. Longwell, and W. A. Peters, A.I.Ch.E.J., Vol. 35, p.120, 1989) that at this temperature and above, secondary thermal cracking of the volatile products increases gas yields at the expense of liquid. Thus the requirement of short gas residence times in single fluid beds implies that they should be shallow beds which leads to the aforementioned difficulties in scaling up.

Therefore if it could be demonstrated that pyrolysis was feasible at lower temperatures and long solids residence times with minimal decrease in primary liquid yield then the simplicity of the classical deep fluid bed would once more make it an attractive approach to biomass pyrolysis.

It was with astonishment that we discovered that, contrary to the prevailing views on the conditions necessary to obtain high liquid yields in biomass Fast Pyrolysis, high yields of liquids of similar composition to those from fast pyrolysis could in fact be obtained by employing a deep fluid bed at relatively low temperature, moderate heating rates and relatively long solids and gas residence times. In particular we discovered that thermolysis in a deep fluid bed at atmospheric pressure, with temperatures in the range 360°–490° C., and gas residence times in the range 2–25 seconds, liquid yields and compositions similar to those of from Fast Pyrolysis at much higher temperatures and very short residence times (0.5–1 second) could be obtained.

These new conditions are such as to facilitate significant enhancement of the thermal efficiency and to reduce capital and operating costs of biomass pyrolysis to liquids, which is especially important for fuel applications in which the economics are presently very marginal.

Table 1 compares the product distribution obtained by the disclosed thermolysis process with those from other current Fast Pyrolysis processes.

According to the present invention, high liquid (bio-oil) yields, comparable to those obtained by Fast Pyrolysis at much higher temperatures, (500° C.), are obtained by thermolysis at the preferred temperature of 430° C. at atmospheric pressure in an indirectly heated deep fluidized bed. On the other hand, at 430° C., Fast Pyrolysis of hardwoods produces liquid yields of only about 60 weight %.

In another aspect of this invention, the composition of the liquids are similar to those from Fast Pyrolysis. For example, from a hardwood feed we obtained a total liquid yield of about 75 weight % and water yield of about 12 weight %, both on a moisture free feed basis. The concentrations of hydroxyacetaldehyde and acetic acid in the water free organic liquids were 11.4 weight and 4.4 weight %, respectively, which are typical of Fast Pyrolysis processes.

In yet another aspect, the char yields from the disclosed process are far lower than those from Fast Pyrolysis at comparable temperatures. Moreover, the char can be thermally annealed in a suitable char converter vessel to give char yields even lower than from Fast Pyrolysis at 500° C.

TABLE 1

Comparison of Yields from Various Pyrolysis Processes.

| Process | Temp. °C. | Yields, Wt % Hardwoods Sawdust Feed | | |
|---|---|---|---|---|
| | | Char | Bio-Oil | Gas |
| Waterloo Fast Pyrolysis[a] | 425 | 30.5 | 59.6 | 5.9 |
| Waterloo Fast Pyrolysis[b] | 500 | 7.7 | 78.0 | 10.8 |
| Ensyn Rapid Pyrolysis[c] | 425 | 30.5 | 59.6 | 5.9 |
| Present Process | 430 | 12.5 | 74.3 | 10.1 |

TABLE 1-continued

Comparison of Yields from Various Pyrolysis Processes.

| Process | Temp. °C. | Char | Bio-Oil | Gas |
|---|---|---|---|---|
| | | Yields, Wt % Hardwoods Sawdust Feed | | |
| Present Process with Char Converter @800° C. | 430 | 4.5 | 73.0 | 19.0 |

[a] D. S. Scott, "Pyrolysis of Biomass to Produce Maximum Liquid Yields", Canadian Patent No. 1,332,580
[b] C. Peacocke, Ablative Pyrolysis of Biomass, Ph.D. Thesis, Aston University, 1994, P. 172.
[c] G. Underwood, R. G. Graham, "Method of Using Fast Pyrolysis as Liquid Smoke", U.S. Pat. No. 4,994,297.

The results reported by J. A. Knight, C. W. Gorton (in "Oil Production by Entrained Flow Pyrolysis of Biomass", Bioenergy 84, H. Egneus, A. Ellegard, (Eds.) Elsevier Applied Science, 1985, pp 914, Vol. 3) may also be mentioned here. In a so called "entrained flow pyrolyzer" the yield of char was 19.8 weight and the oil yield below 40 weight at 430° C. These results are especially notable as they were obtained at temperatures similar to the ones proposed here, and yet produced a very different product distribution; in particular the liquid yields reported in the Knight article are far lower and char yields far higher than in the process of the present invention. In fact, the foregoing result is understandable in that the two processes exhibit some very different characteristics. In particular the entrained flow system uses process gas as the source for direct heating of the biomass in contrast to the solid-solid contacting fluidized bed employed in the present invention. Furthermore, the entrained flow system is a dilute phase in contrast to the dense phase of a bubbling fluidized bed. The liquid yields of the present invention are believed to be optimal from the point of view of energy efficiency and cost of production. The simplicity of design, simplified technology and environmentally sound solid-char treatment are additional bonuses.

A well known fluidized bed biomass pyrolyzer is that operated by Union Fenosa in Spain according to the aforementioned Waterloo Fast Pyrolysis Process (Pyrolysis Network for Europe, Minutes of Second Meeting, November, 1995, Appendix 7). The Union Fenosa pyrolyzer features a shallow fluidized bed operating at 500° C., 50 kPa gauge pressure and 0.5–1 second gas residence time. However, it has the unfortunate limitation that heat delivery is tied to the thermal capacity of recirculated product gases which cannot be heated in the recuperator to temperatures greater than 900° C. Thus, increasing the heat supply requires increasing the gas recirculation which puts additional load on the quenching system, demister units and compressor which must compensate for the increased overall pressure differential.

By contrast, in the process of the present invention, the use of lower pyrolysis temperatures, deep fluidized beds and long gas residence times facilitates the use of basic heat exchangers and economizers to provide an independent heat supply to the bed on account of the more favourable temperature differential with the bed and the greater bed depth. For example the utilization of tube banks or similar heat transfer devices is characterized by high solid to solid heat transfer coefficients guaranteeing high heat fluxes to the bed. At bed temperatures of 400° C. the temperature differential between the sand and tubes can be as high as 600° C. or more.

Additionally, the use of an indirectly heated system makes it possible to place a char converter sub-system within the heat exchanger which can treat the already hot char product to temperatures of 800° C. or more. Such a char converter causes additional generation of gas and volume reduction of the char by thermal annealing. Since it is known that metals in the feed will tend to end up in the char product, especially at lower pyrolysis temperatures, this sub-system can be particularly beneficial for heavy metal contaminated feedstocks for which the product chars must be disposed off by land-filling where volume reduction and stabilization of the char is economically beneficial. Furthermore such a sub-system provides the option to convert the char to specialty carbons. For example activated carbons may be generated quite easily by coupling a $CO_2$ or $H_2O$ purge to the char converter.

Another benefit to this system of char gasification is that it solves a known problem in the direct combustion of biomass, particularly, those having high ash content like straws. That ash content has an alkaline salt which produces severe corrosion problems. With this invention the char can be completely gasified in the char converter to give an ash product and fuel gas. By using this combination of pyrolysis and gasification, the system of this invention can be used in place of direct biomass combustion.

The low permissible fluidization gas velocities disclosed by this invention reduces attrition of the biomass particles which tends to produce contamination of the bio-oil product by very fine "micro-carbon" char particles. Micro-carbon contamination of the bio-oil leads to difficulties in pumping the oil through nozzles in fuel applications as well as technical and environmental problems associated with contamination of the oil by metal ions. This in turn makes it necessary to implement cold filtration of the liquid bio-oil product or on-line hot gas filtration of the vapours from the pyrolyzer (J. P. Diebold et al, Bio-Oil Production and Utilization, Proc. 2nd EU-Canada Workshop on Thermal Biomass Processing, A. V. Bridgewater and E. N. Hogan (Eds.), CPL Press, 1996, p. 66). It is therefore a benefit of this process that these difficulties are eliminated or reduced.

Yet another potential benefit of this invention is that at the low processing temperatures disclosed, the bio-oil liquid product is likely to contain a greater concentration of oxygenated functional groups like aldehydes and carboxylic acids. This is important for bio-oil applications like Bio-Lime (trademark), (see U.S. Pat. No. 5,458,803), acetals production (see European Patent Application 95309400.0) and organic slow release nitrogen fertilizers (see European Patent Application 95308934.9) in which these functional groups are reacted with lime, alcohol and ammonia respectively, or liquid smoke (see U.S. Pat. No. 4,994,297).

In another beneficial aspect the use of a sufficiently deep fluid bed operating under conditions in which the gas is in plug flow and the solids are back-mixed is the possibility of partial gasification of the char in the fluid bed itself, provided that the feed point is sufficiently above the entry point of the fluidizing gas. In this case it will readily be apparent to those skilled in the art how the required back-mixing of solids may be augmented by means of draft tubes and the like.

In yet another beneficial aspect, the use of a sufficiently deep fluid bed allows the use of tube banks immersed in the bed to provide for indirect heating.

The present invention is also very beneficial for systems in which biomass and coal are combusted. It is known ("Alkali Deposits Found in Biomass Power Plants", T. Miles et al., National Renewable Energy Report, NREL/TP433-8142, 1996) that direct combustion of biomass in coal combustors is often problematic on account of the fouling and corrosion of heat exchanger surfaces by deposition of mineral matter originating in the biomass feedstock. This is especially true for feedstocks like straws which have particularly high potassium and chloride content in the ash.

Pyrolysis approaches have the potential to effect solutions to this problem because mineral matter in the feedstock tends to accumulate in the char (e.g. see D. Meier et al, in "Bio-Oil Production and Utilization", eds. A. V. Bridgewater and E. N. Hogan, CPI, Press, 1996, p. 102) rather than in the liquid or gaseous products. Consequently, by pyrolyzing the biomass, separating the char and burning only the volatile products the problem of fouling may be considerably mitigated. Furthermore it is also known that the extent of volatilization of mineral matter during biomass pyrolysis is significantly reduced as the pyrolysis temperature is lowered; the most desirable temperatures being below 450° C. Therefore the best pyrolysis system for this application will be one in which pyrolysis can be carried out below 500° C., but in spite of the low temperature to produce high yields of volatile products (i.e. gases and liquids) and low char yields.

The thermolysis process of this invention is expressly designed for pyrolysis to produce high yields of volatiles at low temperatures and is therefore particularly suited to this application A suitable system for coal-biomass co-combustion consists of a fluidized-bed pyrolyzer of the kind described in this invention directly coupled to the coal combustor so that the hot gas, vapour and aerosol products of pyrolysis are not quenched but instead are fed directly into the coal combustion zone. The fluidization gas for the pyrolyzer would consist of a hot flue gas removed at a suitable temperature from the combustor. Furthermore, since this process utilizes an indirectly heated fluidized bed the heat requirement for pyrolysis can be also be provided by flue gases taken at a suitable temperature. This system has the following advantages:

(1) All sensible heat in the products is retained so thermal efficiency is increased.

(2) No expensive bio-oil quenching system is required thus reducing capital and operating costs.

(3) No gas re-circulation system is necessary which further reduces capital and operating costs.

(4) Since the process operates at low ratios of fluidizing gas to biomass there will not be a significant dilution of the combustible product gas by inert flue gases.

(5) Mineral matter, especially alkali and chlorine, is largely retained in the char.

(6) The residual fuel value retained in the char may be recovered by either direct combustion or gasification of the char in a separate sub-system.

The following calculation illustrates the benefits of the direct injection of the hot volatile pyrolysis products into the combustor in comparison with the alternative of producing the bio-oil off-site and injecting it cold into the coal combustor. Assuming a typical liquid yield of 65 wt % of moisture free organics on a moisture free feed basis, that the biomass feed to the pyrolyzer contains 10 wt % moisture, and that the pyrolysis process produces 12 wt % of water of reaction on a moisture-free feed basis, then it may be calculated that a total of 1.48 MJ per kg of heat will be lost on quenching and condensing the dry bio-oil from 700 K (the assumed pyrolysis temperature) and reheating the wet bio-oil product to 700 K. This represents about 10% of the total heating value of the bio-oil produced. Furthermore, it is reasonable to assume that the non-condensable gas product from pyrolysis will not be available for the coal combustor if the bio-oil is produced off-site. This leads to a further loss in energy availability of about 6.5% for a total of about 16.5% of the total heating value of the bio-oil produced. This loss increases by about an additional 2% for each 100° C. increase in pyrolysis temperature. This calculation does not include the additional energy savings over the pumping costs associated with the use of a quenching system. It may be concluded that the direct utilization of the hot uncondensed aerosols, vapours and gases from the pyrolyzer is highly preferable to off-site preparation of bio-oil.

Conventional fast pyrolysis optimally produces 50–65 wt % of bio-oil and 20 wt % of char from wheat straw containing 5 wt % of ash, (e.g. see Scott, Piskorz and Radlein, Industrial and Engineering Chemistry, Vol. 24, 1985, p 581). The heating value of 1 kg of straw is about 19.3 MJ/kg. On the other hand, by comparison with the results for hardwoods, it is anticipated that char production from straw could be reduced to as low as 15% by the process of this invention. Thus, for char production in the range 12–20 wt % the fuel value retained in the char will be 3.9–5.9 MJ per kg of biomass feed or 20–30% of the total fuel value of the straw feed. This emphasizes the importance of pyrolysis processes which minimize char formation and possibly the necessity of a method to recover the remaining fuel value in the char without subjecting it to high temperatures.

It is well-known in the art that char may be gasified by steam, carbon dioxide, air or preferably combustor flue gas which is a combination of the two. Gasification requires higher temperatures than pyrolysis—typically greater than 700° C. However, in contrast to the situation with biomass gasification, an important advantage to this approach is that the char may be safely gasified without significant emission of corrosive inorganic salts, ("Decentralized Gasification of Pelletized Char Produced" from "Biomass", R. Hummelshoj, in "Biomass for Energy, Environment, Agriculture and Industry", eds. Chartier, Beenackers and Grassi, Elsevier, 1995). Apparently the removal of the volatile organic matter during pyrolysis stabilizes the residual ash in such a manner as to inhibit its volatilization even at high temperatures.

Therefore, it is a benefit of this invention that it allows pyrolysis of biomass at a low temperature and gasification of the char product at a high temperature such that overall emissions of volatile corrosive inorganic material are minimized.

The natural separation of inorganic matter from volatile matter characteristic of low temperature pyrolysis is also very beneficial for use in internal combustion engines. Besides the avoidance of fouling, corrosion and erosion problems there is a further advantage that pyrolysis directly produces finely divided aerosols which are well suited for injection into both Diesel and Otto cycle engines. Condensed, liquefied bio-oil from pyrolysis is very difficult to atomize to produce the fine droplets necessary for smooth and efficient combustion on account of its highly viscous nature.

Therefore, a desirable application of the process of this invention is the direct coupling of the pyrolyzer to an internal combustion engine such that the hot volatile matter, including aerosols and gases are injected directly into the engine without prior condensation of the liquids. A further advantage of this arrangement is the avoidance of the loss in energy efficiency associated with the quenching stage of the normal production of liquefied bio-oil. As was explained in a previous section the sensible heat content of the volatile products of pyrolysis cannot be recovered in practice on account of the thermally sensitive character of bio-oils.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENT

The biomass feed for the process may consist of wood sawdust, bark, yard waste, waste lumber, agricultural wastes, peat, paper mill wastes, cellulosic wastes, municipal solid waste, food processing wastes, sewage sludge and the like.

Figure 1:
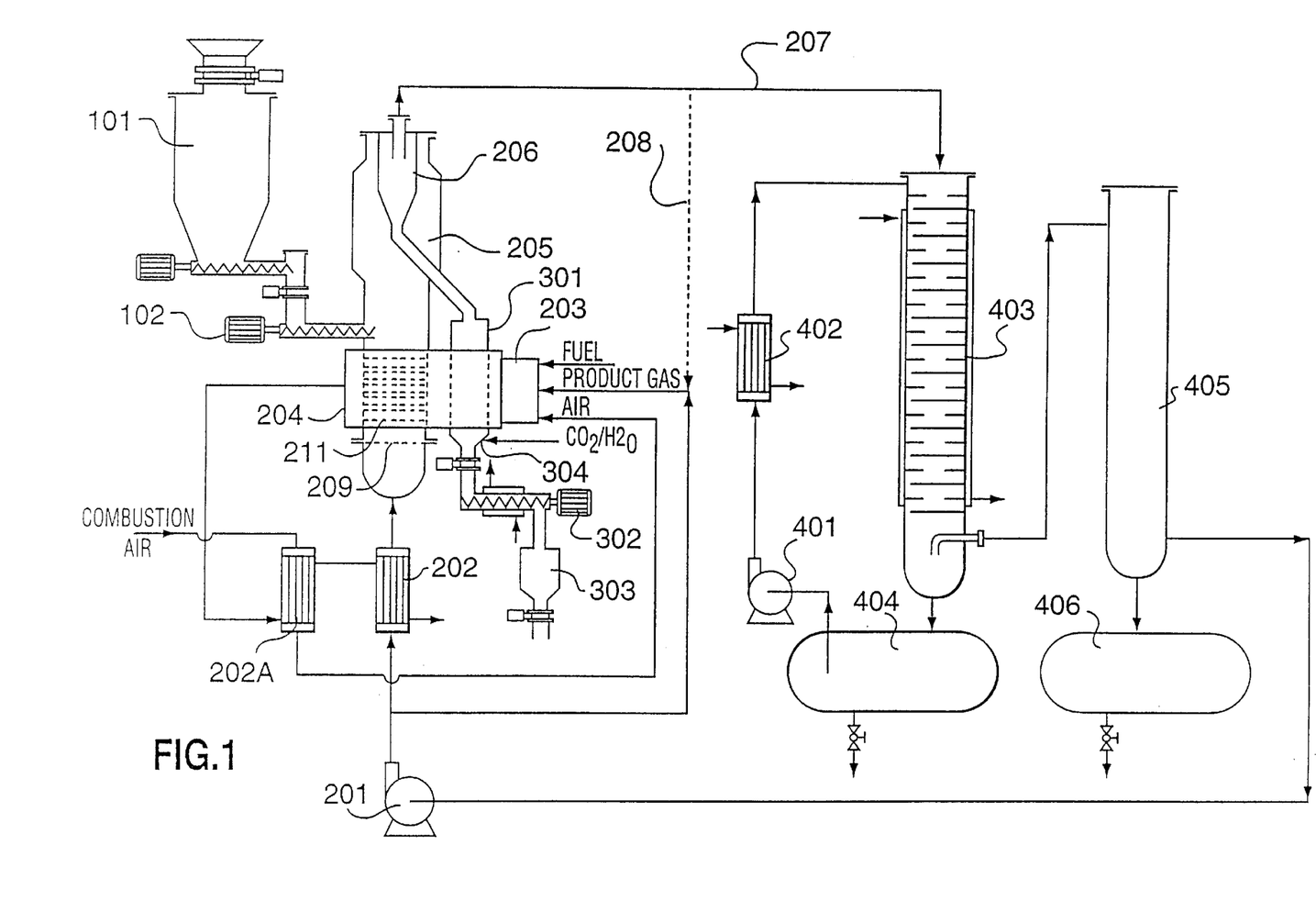
FIG. 1 is a schematic illustration of the thermolysis system.

The biomass to be thermolyzed is dried to less than 10 weight % moisture content and ground to less than 3 millimeters in its shortest dimension. Referring now to FIG. 1, the prepared feedstock is stored in hopper 101 from which it is metered by means of a variable screw-feeder to a constant speed screw-feeder 102 which transfers it rapidly to the thermolysis reactor 205.

In the reactor 205 is a deep fluidized bed 211 of inert material capable of withstanding temperatures up to 1500° C., for example silica sand. In order to have good fluidization at the low gas flow rates the particle size of the bed material should preferably be in the range of about −20 to +100 mesh. The fluidizing gas comprises recycle product gas which is distributed through distributor plate 209. The size of the reactor 205 is chosen according to the designed feed capacity of the system.

Of significance is the discovery that gas residence time in the bed is no longer a major design limitation. Consequently the bed depth is now constrained only by the requirement that the linear gas velocity through the bed be in the range 10–80 centimeters per second. This range allows product char particles to be blown out of or eluviated from the bed automatically when thermolysis is complete. In a practical system the gas residence time may exceed 10 seconds. There is no specific requirement on the residence time of biomass solids although it is recognized that an excessive inventory of char product in the bed can promote bio-oil cracking leading to loss of liquid product. Nevertheless these problems are mitigated by the low thermolysis temperatures disclosed in the invention.

The effluent from the reactor 205 consists of a mixture of recycle gas, together with the product vapours, aerosols, gases and char particles.

Char particles are removed from the effluent in cyclone 206 which in this embodiment is internal to the reactor 205 in order to easily fulfill the previously stated requirement that the product vapours and effluent should not be allowed to contact dry surfaces at less than 380° C. Nevertheless it is also possible to place the cyclone 206 external to the reactor 205 so long as this requirement is fulfilled.

The effluent is conveyed via transfer line 207 to the product collection sub-system. This line must also be maintained at greater than 380° C. The optional connection 208 provides a means to separate a portion of the reactor effluent to provide supplemental fuel for process heat.

The effluent then enters scrubbing tower 403 where it is directly quenched by a suitable liquid such that the combined liquid product exiting the bottom of the scrubbing tower 403 be no hotter than 60° C. The combined liquid product is stored in tank 404. In the particular embodiment illustrated here the quench liquid is liquid bio-oil which is cooled in heat exchanger 402 to a temperature below 60° C. However this is not a limitation as other liquids, including immiscible liquids, which may even be reactive, may be used if desired.

After quenching there will usually be a small amount of aerosol persisting which must be removed in demister 405 and collected in tank 406. This demister 405 may be of any suitable type, for example electrostatic precipitators, packed beds, Venturi demisters, mesh coalescers etc.

The clean gas product leaving the demister 405 is typically a low to medium BTU gas consisting principally of carbon dioxide, carbon monoxide and methane. It is recycled by compressor 201 for use as the recycle fluidizing gas.

Some of the product gas is burned along with a supplemental fuel, for example natural gas or propane, in combustor 203. The combustor flue gas is passed through heat exchanger 204 where it delivers heat to the fluidized bed material. In this particular embodiment the heat exchanger consists of tubes. However, the heat exchanger could also be a jacket surrounding the reactor at the level of the fluidized bed 211. The flue gases exit heat exchanger 204 at less than 600° C. and are further used to pre-heat the combustion air by means of heat exchanger 202A and the recycle fluidizing gas by means of heat exchanger 202.

The optional char converter subsystem consists of the catch-pot 301 which functions as a gasifier. In the illustrated embodiment char gasification is accomplished by heating vessel 301 by the combustor flue gas. Carbon dioxide 304 may optionally be injected into vessel 301 to promote further gasification or char activation. The final solid char or ash product is removed by the screw conveyer 302 and collected in bin 303.

Figure 2:
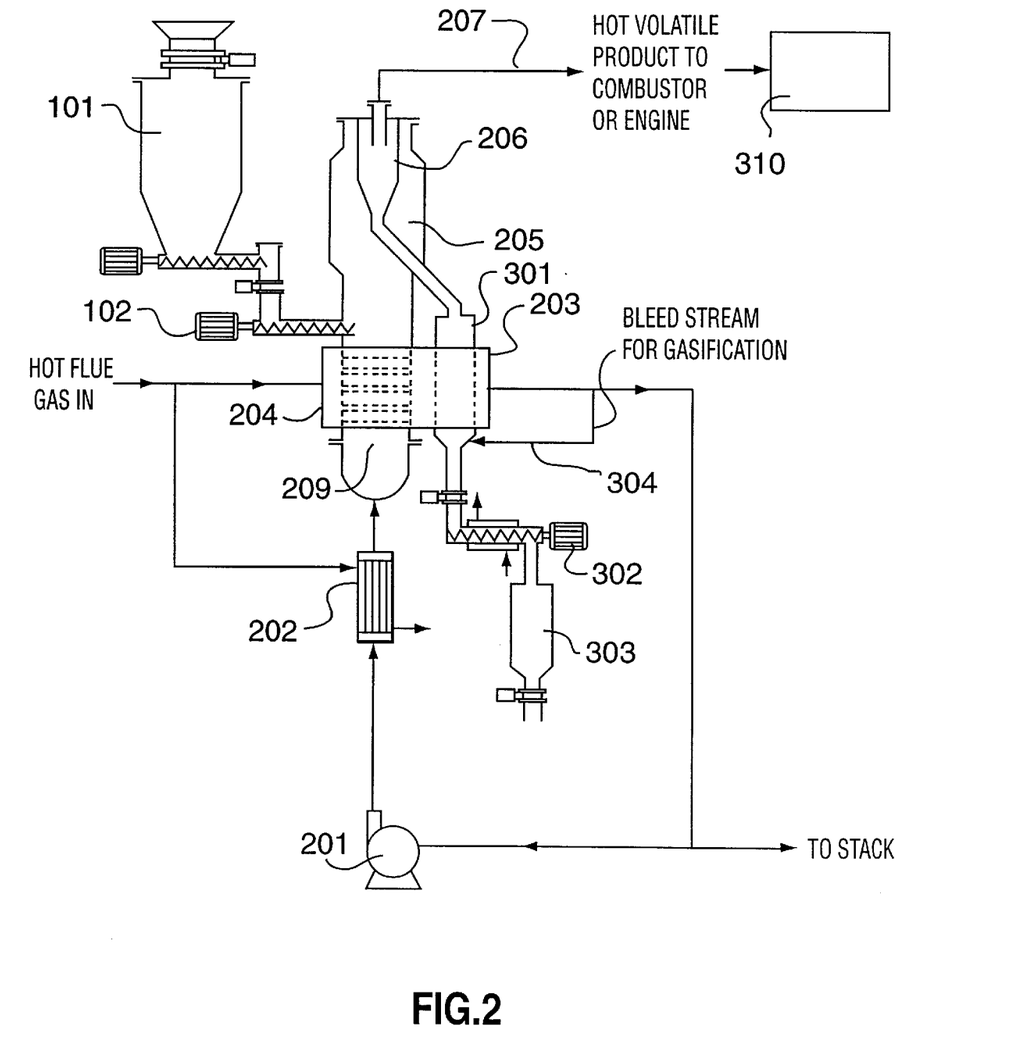
FIG. 2 illustrates an application of the thermolysis system to a biomass-coal co-combustion process in which the hot volatile products of pyrolysis are not condensed but instead are injected directly into the combustor, and in which the char product is optionally gasified in situ to produce additional fuel gas.

FIG. 2 illustrates an application in which the process described herein is directly coupled to a combustion system which may be a coal combustion system 310, an internal combustion engine (not shown), or more generally any kind of thermal power producing system (also not shown). Without in any way restricting the field of application, the following discussion refers to a coal-biomass co-combustion system.

The pyrolyzer is essentially the same as that described in the process of FIG. 1. The principal differences from that process are the absence of a bio-oil quenching and collection and gas recirculation sub-systems. Feed preparation and feeding as well as the reactor design considerations and are similar to those described in FIG. 1.

However, the reactor fluidizing gas comprises flue gas from the combustor 203 which is conveyed through the fluidized bed by means of blower 201. If necessary the fluidizing gas may be further pre-heated in heat exchanger 202.

In contrast to FIG. 1 the transfer line 207 now leads directly to the coal combustor 310 instead of to a product quenching and collection subsystem. There it is injected at a suitable and convenient point and burnt along with the coal. The combustor 310 may be of various designs including fluidized bed combustors. As in FIG. 1 the transfer line 207 is maintained at a temperature greater than 380° C. to prevent fouling by condensation of pyrolysis product aerosols.

The bed is heated indirectly by means of heat exchange with hot flue gases, in the temperature range from 700°–1,000° C., from the combustor 203. Hot flue gas from the combustor 301 is used to provide additional heat to the fluidized bed. The heat exchanger 204 envisaged in this example is of a tubular type but this choice is not intended to be restrictive in any way.

The cooled flue gas exiting this heat exchanger 204 at about 600° C., heats the optional char gasifier 301. A bleed stream, 304, provides a gas rich in both carbon dioxide and steam which is a suitable mixture to promote gasification of the char. If it is desired a small amount of air may be mixed with stream 304 to provide a more oxidative atmosphere for gasification. The final ash product of gasification is removed by screw conveyor 302 and collected in bin 303.

In this example the carbon monoxide enriched product of char gasification is mixed with the hot volatile pyrolysis products by counter-current flow back through the cyclone. Alternative points of mixing will however become apparent to those skilled in the art.

Alternations and modifications of the embodiment described herein will become apparent to those skilled in the art. Therefore the scope of this invention should not be unduly restricted by this description which should only be limited by the appended claims.

We claim:

1. A process for the thermolysis of shredded biomass, comprising:
    (a) introducing the biomass, shredded to a sufficiently small size so that its size does not limit significantly the production of combustible vapours, aerosols and gas, into a thermolysis reactor having a bed of inert material with a height to width ratio greater than one;
    (b) introducing substantially non-oxidizing gas upwardly through the bed at a linear velocity so as to cause automatic elutriation of product char and fluidizing of the bed of inert material to form a fluidized bed;
    (c) heating indirectly the fluidized bed so that the substantially non-oxidizing gas and fluidized bed have a temperature in the range of 360° to 490° C. and the substantially non-oxidizing gas and fluidized bed cause the thermolysis of the biomass producing an effluent reactor stream comprising hot char particles and volatiles, namely, gas, aerosols, and vapours; and
    (d) removing the elutriated char particles from the effluent reactor stream;
        wherein the fluidized bed is sufficiently deep so that the residence time of the substantially non-oxidizing gas in the reactor is greater than 2 seconds.

2. A process according to claim 1, wherein the residence time of the substantially non-oxidizing gas is greater than 2 and less than or equal to 25 seconds.

3. A process according to claim 1, wherein said fluidized bed is heated by means of heat exchange between hot gases and the fluidized bed.

4. A process according to claim 1, wherein said substantially non-oxidizing gas has a temperature of 430° C.

5. A process according to claim 1, wherein the velocity of the substantially non-oxidizing gas through the fluidized bed is in the range of 10 to 80 centimeters per second.

6. A process according to claim 1, wherein the pressure of the fluidized bed is in the range of −100 to +100 kilopascals gauge.

7. A process according to claim 1, wherein the mass ratio of substantially non-oxidizing gas to biomass is less than 2:1.

8. A process according to claim 1, wherein the biomass comprises particles having a smallest dimension of less than or equal to 3 millimeters.

9. A process according to claim 1, wherein the char is collected and held in a char converter at temperatures above 700° C. and including purging the char with carbon dioxide, steam, and gas mixtures containing carbon dioxide and steam or sub-stoichiometric amounts of air in order to gasify the char.

10. A process according to claim 1, wherein the char is collected and held in a char converter at temperatures above 700° C. and including purging the char with carbon dioxide, steam, and gas mixtures containing carbon dioxide and steam or sub-stoichiometric amounts of air in order to generate activated carbon.

11. A process according to claim 1, wherein the char is collected and held in a char converter at temperatures above 700° C. for a time sufficient to reduce the volume of the char by thermal annealing.

12. A process according to claim 1, including adding oxygen or air at the bottom of the deep bed such that there is oxygen starvation at a feed point of the biomass.

13. A process according to claim 1, wherein the particle size of the material in the bed of inert material is in the range of −20 to +100 mesh.

14. A process according to claim 1, including quenching the gas, aerosols and vapours with a cold liquid to partly liquify the vapours and aerosols so that the vapours and aerosols do not contact dry surfaces of the quencher whose temperatures are in the range of 100° to 360° C., wherein said cold liquid is reactive towards said vapours and aerosols when condensed.

15. A process according to claim 1, including quenching the gas, aerosols and vapours with a cold liquid to partly liquify the vapours and aerosols so that the vapours and aerosols do not contact dry surfaces of the quencher whose temperatures are in the range of 100° to 360° C., wherein said substantially non-oxidizing gas is recycled fluidizing product gas which after quenching, is recirculated.

16. A process for the thermolysis of shredded biomass to produce combustible gas, vapour and aerosols similar in composition to gas, vapour and aerosols produced from fast pyrolysis, comprising:
    (a) introducing the biomass, shredded to a sufficiently small size so that its size does not limit significantly the production of combustible gas, vapour and aerosols, into a thermolysis reactor having a bed of inert material with a height to width ratio greater than one;
    (b) introducing substantially non-oxidizing gas upwardly through the bed at a linear velocity so as to cause automatic elutriation of product char and fluidizing of the bed of inert material to form a fluidized bed;
    (c) heating indirectly the fluidized bed so that the substantially non-oxidizing gas and fluidized bed have a temperature in the range of 360° to 490° C. and the substantially non-oxidizing gas and fluidized bed cause the thermolysis of the biomass producing an effluent reactor stream comprising hot char particles and volatiles, namely, gas, aerosols, and vapours; and (d) removing the elutriated char particles from the effluent reactor stream;

(e) injecting the hot gas, aerosols and vapour from the reactor into a second combustion system where they are burned to produce heat;

wherein the fluidized bed is sufficiently deep so that the residence time of the substantially non-oxidizing gas in the reactor is greater than 2 seconds.

17. A process according to claim 16, wherein the velocity of the substantially non-oxidizing gas is in the range of 10 to 80 centimeters per second, the mass ratio of said gas to biomass is less than 2:1, and the smallest dimension of the biomass particles is less than or equal to 3 millimeters, and wherein the char is collected and held in a char converter at temperatures above 700° C. for a time sufficient to reduce the volume of the char by thermal annealing.

18. Apparatus for thermolyzing shredded biomass particles to produce liquid similar in composition to liquid produced from fast pyrolysis, comprising:

(a) a thermolysis reactor having a bed of inert material, a gas inlet at a bottom thereof for conducting non-oxidizing gas upwardly through said bed of inert material to form a fluidized bed, a transfer line at a top thereof for conducting away volatile effluent and char collection means for collecting char from the reactor; and (b) a combustor for burning gas and generating heated flue gas; and (c) a heat exchanger thermally coupled to said bed of inert material and to the heated flue gas from said combustor for heating the latter.

19. Apparatus according to claim 18, including (a) a liquid quencher having an input at a top thereof coupled to said transfer line and an output at a bottom thereof, a product liquid tank having an input port coupled to the output of said quencher to collect quenched liquid therefrom, a liquid quencher input port coupled an outlet of said product liquid tank to withdraw quenched liquid and to use it to quench the volatile effluent from said thermolysis reactor, and a clean recycle gas output proximate a bottom thereof;

(b) a recycle line coupled to the clean recycle gas output to receive gas emitted from said quencher and direct it into said gas inlet of said reactor.

20. Apparatus according to claim 18, including a second combustor coupled to said transfer line operative to burn gas, vapour and aerosols from said thermolysis reactor.

* * * * *